United States Patent [19]

Hartman et al.

[11] 4,403,093
[45] Sep. 6, 1983

[54] POLYESTERS

[75] Inventors: Marvis E. Hartman, Pittsburgh; Barbara A. Greigger, Allison Park; Rostyslaw Dowbenko, Gibsonia, all of Pa.

[73] Assignee: PPG Industries, Inc., Pittsburgh, Pa.

[21] Appl. No.: 425,759

[22] Filed: Sep. 28, 1982

[51] Int. Cl.$^3$ .............................................. C08G 63/42
[52] U.S. Cl. ...................................... 528/297; 525/438; 525/440; 525/443; 528/176
[58] Field of Search ................ 528/176, 297; 525/438, 525/440, 443

[56] References Cited

U.S. PATENT DOCUMENTS

| | | | |
|---|---|---|---|
| 3,006,897 | 10/1961 | Parker | 260/75 |
| 3,089,863 | 5/1963 | Hicks et al. | 260/75 |
| 3,114,735 | 12/1963 | Pigott | 260/75 |
| 3,329,739 | 7/1967 | Semroc | 260/850 |
| 3,376,272 | 4/1968 | Masters et al. | 260/78.4 |
| 3,376,273 | 4/1968 | Masters et al. | 260/78.4 |
| 3,389,103 | 6/1968 | Sekmakas | 260/21 |
| 3,478,126 | 11/1969 | Turpin | 260/835 |
| 3,690,927 | 9/1972 | Parker et al. | 117/93.31 |
| 3,857,817 | 12/1974 | Henshaw et al. | 260/67.6 R |
| 3,882,189 | 5/1975 | Hudak | 525/443 X |
| 3,912,790 | 10/1975 | Chang et al. | 260/849 |
| 3,919,144 | 11/1975 | Formaini et al. | 525/443 X |
| 3,928,420 | 12/1975 | Fang | 260/475 P |
| 3,928,492 | 12/1975 | Fang | 260/850 |
| 3,954,715 | 5/1976 | Fang | 260/67.6 R |
| 3,994,851 | 11/1976 | Chang | 260/29.4 R |
| 4,017,556 | 4/1977 | Wang | 260/856 |
| 4,021,505 | 5/1977 | Wang | 260/856 |
| 4,028,309 | 6/1977 | Fang | 260/77.5 AN |
| 4,046,729 | 9/1977 | Scriven et al. | 525/443 X |
| 4,080,318 | 3/1978 | Smith et al. | 525/443 X |
| 4,101,603 | 7/1978 | Smith et al. | 525/443 X |
| 4,101,603 | 7/1978 | Smith et al. | 260/850 |
| 4,104,240 | 8/1978 | Buter | 260/39 P |
| 4,113,702 | 9/1978 | Psencik | 528/75 |
| 4,144,395 | 3/1979 | Murphy et al. | 560/200 |
| 4,158,652 | 6/1979 | Koleske et al. | 260/29.4 UA |
| 4,165,345 | 8/1979 | Smith et al. | 525/419 |
| 4,169,825 | 10/1979 | Yapp et al. | 260/31.6 |
| 4,171,423 | 10/1979 | Smith et al. | 528/297 X |
| 4,171,423 | 10/1979 | Smith et al. | 528/289 |
| 4,271,062 | 6/1981 | Boomgaard et al. | 260/39 P |
| 4,279,800 | 7/1981 | Boomgaard et al. | 260/39 P |
| 4,314,918 | 2/1982 | Birkmeyer et al. | 260/20 |
| 4,322,506 | 3/1982 | Peng et al. | 525/110 |
| 4,322,508 | 3/1982 | Peng et al. | 525/110 |

FOREIGN PATENT DOCUMENTS 743674 6/1974 South Africa .
1317969 5/1973 United Kingdom .

OTHER PUBLICATIONS

Farbe und Lack, "Structure Dependent Properties of High Solids Polyester Coatings" by Dr. Roel Buter, Akzo Research, pp. 307–312, 4/80.

*Primary Examiner*—Lucille M. Phynes
*Attorney, Agent, or Firm*—William J. Uhl

[57] ABSTRACT

Ungelled polyester oligomers which are formed from reacting polyols, 1,2-dicarboxylic acid anhydrides and polyepoxides are disclosed. The polyesters are useful as resinous binders in high solids coating compositions. The coating compositions can be applied by spraying and do not result in a tacky overspray common with many high solids coating compositions.

18 Claims, No Drawings

POLYESTERS

BACKGROUND OF THE INVENTION

1. Field of the Invention

The present invention relates to polyesters and to their method of preparation.

2. Brief Description of the Prior Art

Low molecular weight polyesters formed from reacting polyols with dicarboxylic acids or anhydrides and monoepoxides are known in the art. Such polyesters are useful as resinous binders in the formulation of high solids coating compositions. Typical of the prior art in the area is U.S. Pat. Nos. 3,928,420; 4,104,240 and 4,113,702. There are problems associated with the polyesters of the above-mentioned prior art. If the choice of reactants and the reaction conditions are not carefully controlled, there can be a considerable amount of polyesterification and unreacted polyol formed. Unreacted polyol results in volatile organic content in the resultant coating composition which is undesirable because of increasingly stringent governmental emission standards. Another problem is associated with the low viscosity of the polyester. Low viscosity is, of course, desirable for the formation of high solids coating compositions. However, if the coating compositions are spray applied, there will be an overspray which misses the substrate and accumulates in the printing booth. The low viscosity uncured resinous materials do not harden with time and can become very tacky and slippery creating a hazard to the personnel working in the area.

The present invention overcomes the aforementioned problems by providing a polyester which results in substantially dry overspray and low volatile contents. In the present invention, a polyol is reacted with a 1,2-dicarboxylic anhydride under reaction conditions sufficient to form the half-ester with substantially no polyesterification product and unreacted polyol. This product is then reacted with a polyepoxide to form the polyester. Reaction with the polyepoxide results in chain extension and molecular weight build up which is sufficient to overcome the tacky overspray problems mentioned above.

SUMMARY OF THE INVENTION

In accordance with the present invention, an ungelled polyester oligomer and a process for its preparation are provided.

The polyester oligomer is believed to have the following structural formula:

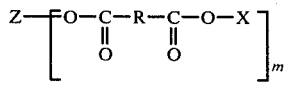

where Z is the residue of a polyepoxide after ring opening with a carboxylic acid group; R is an aliphatic or an aromatic moiety; X is the residue of a polyol after reaction with an anhydride and m=the number of epoxy groups of the polyepoxide ring opened with carboxylic acid groups.

The ungelled polyester oligomer can be formed from:
(A) reacting a 1,2-dicarboxylic acid anhydride with a polyol under conditions sufficient to form a half-ester with substantially no polyesterification product, (B) reacting said half-ester with a polyepoxide under conditions sufficient to form the ungelled polyester oligomer.

DETAILED DESCRIPTION

In preparing the polyester oligomers of the present invention, a 1,2-dicarboxylic acid anhydride is reacted with a polyol under conditions sufficient to ring open the anhydride forming the half-ester with substantially no polyesterification occurring (i.e., both carboxyl groups of the anhydride esterified by polyol in a recurring manner). By this is meant that less than 10, preferably less than 5 percent by weight of polyester is formed.

In bringing an anhydride and a polyol together under suitable reaction conditions, reaction can occur in at least two ways. The desired reaction mode involves opening the anhydride ring with hydroxyl, i.e.,

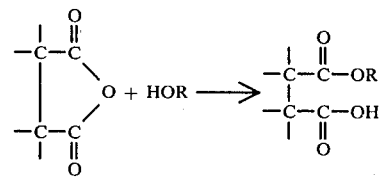

Alternately, carboxyl groups formed by opening of the anhydride ring can react with hydroxyl groups to give off water; a condensation reaction. The latter reaction is not desired since it can lead to polycondensation reactions resulting in products with broad molecular weight distributions.

To achieve reaction, the 1,2-dicarboxylic acid anhydride and polyol are contacted together, usually by mixing the two ingredients together in a reaction vessel. Preferably, reaction is conducted in the presence of an inert atmosphere such as nitrogen, and in the presence of a solvent to dissolve solid ingredients and/or to lower the viscosity of the reaction mixture. Examples of suitable solvents are high boiling materials, and include, for example, ketones such as methyl amyl ketone, diisobutyl ketone, methyl isobutyl ketone; aromatic hydrocarbons such as toluene and xylene; as well as other organic solvents such as dimethylformamide and N-methyl pyrrolidone.

For the desired ring-opening reaction and half-ester formation reaction, a 1,2-dicarboxylic acid anhydride is used. Reaction of a polyol with a carboxylic acid instead of an anhydride would require esterification by condensation to eliminate water which would have to be removed by distillation which, under these conditions, would promote undesired polyesterification. Also, the reaction temperature is preferably low, that is, no greater than 150° C., preferably less than 130° C., and usually within the range of 40° to 150° C., preferably 40° to 130° C. Temperatures greater than 150° C. are undesirable because they promote polyesterification, whereas temperatures less than 40° C. are undesirable because of sluggish reaction.

The time of the reaction can vary somewhat depending principally upon the temperature of reaction. Usually, the reaction time will be from as low as 10 minutes to as high as 24 hours.

The molar ratio of anhydride to polyol is usually from about 0.5 to 2:1, preferably to obtain a maximum conversion with maximum purity, about 1:1. Ratios less than 0.5:1 are undesirable because they result in unreacted polyol which increases the amount of volatile organic emission given off during curing of the coating. Ratios greater than 2:1 are not preferred because of increased formation of less-preferred half-esters.

Among the anhydrides which can be used in the practice of the invention are those which, exclusive of carbon atoms in the anhydride moiety, contain from about 2 to 30 carbon atoms. Examples include aliphatic including cycloaliphatic, olefinic and cycloolefinic anhydrides, and aromatic anhydrides. Substituted aliphatic and aromatic anhydrides are also included within the definition of aliphatic and aromatic provided the substituents do not adversely affect the reactivity of the anhydride or the properties of the resultant polyester. Examples of substituents would be chloro and alkoxy. Examples of anhydrides include succinic anhydride, methylsuccinic anhydride, dodecenylsuccinic anhydride, octadecenylsuccinic anhydride, phthalic anhydride, tetrahydrophthalic anhydride, methyltetrahydrophthalic anhydride, hexahydrophthalic anhydride, methylhexahydrophthalic anhydride, tetrachlorophthalic anhydride, endomethylene tetrahydrophthalic anhydride, chlorendic anhydride, itaconic anhydride, citraconic anhydride, and maleic anhydride.

Among the polyols which can be used are those which contain from about 2 to 20 carbon atoms. Preferred are aliphatic polyols, particularly aliphatic diols or triols, most preferably those containing from 2 to 10 carbon atoms. Examples include ethylene glycol, 1,2-propanediol, 1,3-propanediol, 1,4-butanediol, 1,5-pentanediol, glycerol, 1,2,3-butanetriol, 1,6-hexanediol, neopentyl glycol, diethylene glycol, dipropylene glycol, trimethylolpropane, 2,2,4-trimethylpentane-1,3-diol, 2,2-dimethyl-3-hydroxypropyl 2,2-dimethyl-3-hydroxypropionate and 1,4-cyclohexanedimethanol. Preferred are those aliphatic diols or triols selected from the class consisting of neopentyl glycol, 2,2,4-trimethylpentane-1,3-diol, 2,2-dimethyl-3-hydroxypropyl 2,2-dimethyl-3-hydroxypropionate, diethylene glycol, dipropylene glycol, 1,6-hexanediol and trimethylolpropane. Higher functionality polyols such as tetrols can be used but they are not preferred. An example would be 1,2,3,4-butanetetrol.

After the 1,2-dicarboxylic acid anhydride and polyol are reacted together, the resultant half-ester is further reacted with a polyepoxide to chain extend the half-ester to form an ungelled polyester oligomer. Chain extension occurs through reaction of the carboxylic acid groups of the half-ester with the epoxy groups of the polyepoxide. Although the structure of the chain-extended product is not known with certainty, the major product (i.e., greater than 50 percent by weight based on total polyester weight) is believed to be of the structure:

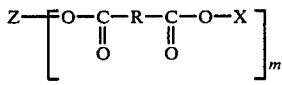

where Z is the residue of a polyepoxide after ring opening with a carboxylic acid group; R is an aliphatic or aromatic group; X is the residue of a polyol after reaction with a polycarboxylic anhydride and m corresponds to the number of epoxy groups of the polyepoxide which are ring opened with carboxylic acid groups. Preferably, m=2 to 3, most preferably 2.

The half-ester and the polyepoxide are reacted together by contacting under conditions sufficient to form the polyester oligomer. Preferably, the half-ester and the polyepoxide are reacted in the presence of an inert atmosphere such as nitrogen. Reaction can be conducted neat, or, as is more usual, in the presence of organic solvent such as those mentioned above in connection with half-ester formation.

The half-ester and polyepoxide can be contacted together by simply mixing the two together. It is preferred to add the polyepoxide to the half-ester incrementally so as to better control the reaction and to obtain higher yields of the desired polyester oligomer. The proportions of the half-ester and the polyepoxide which are reacted together are not critical. Broadly, the equivalent ratio of epoxy to carboxylic acid can be from about 1.0 to 2.5:1. However, to obtain maximum conversion to the desired polyester oligomer, the equivalent ratio of epoxy to carboxylic acid is preferably about 1:1. Ratios less than 1:1 result in less than the optimum amount of chain-extended product, whereas ratios greater than 2.5:1 result in excessive unreacted epoxy.

The temperature of reaction should be less than 160° C., preferably less than 150° C., usually within the range of about 60° to 150° C. Temperatures higher than 160° C. are undesirable because of competition between the hydroxyl groups and epoxy groups for reaction with carboxyl groups resulting in undesirable polyesterification reactions. Reaction temperatures less than 60° C. are undesirable because of sluggish reaction.

Further, a catalyst such as an organophosphine is preferably used. Examples of a suitable catalyst of this sort would be triarylphosphine such as triphenylphosphine. Examples of other catalysts include amines such as triethylamine and inorganic bases such as potassium hydroxide. When catalyst is used, it is used in amounts of about 0.1 to 2 percent by weight, based on total weight of the reactants.

The time of reaction depends on how the reactants are contacted, the temperature of reaction and the presence or absence of catalyst. In general, reaction times will vary from about 30 minutes to 24 hours.

The polyepoxides which are used are those having a 1,2-epoxy equivalency greater than 1, preferably greater than 1, up to about 3.0. Higher functionality polyepoxides, i.e., greater than 3, are not preferred because of considerable chain branching and gelation problems. The preferred polyepoxides are polyglycidyl ethers of polyhydric phenols such as bisphenol A. These polyepoxides can be produced by etherification of a polyhydric phenol with an epihalohydrin such as epichlorohydrin in the presence of alkali. Examples of polyphenols other than bisphenol A are 1,1-bis(4-hydroxyphenyl)ethane, 2-methyl-1,1-bis-(4-hydroxyphenyl)propane, 2,2-bis(4-hydroxy-3-tertiarybutylphenyl)propane, bis-(2-hydroxynaphthyl)methane, 1,5-dihydroxynaphthalene, or the like. Besides polyhydric phenols, other cyclic polyols can be used, particularly cycloaliphatic polyols such as 1,2-cyclohexanediol, 1,4-cyclohexanediol, 1,2-bis(hydroxymethyl)cyclohexane, and hydrogenated bisphenol A.

Also, polyglycidyl ethers of polyhydric alcohols such as ethylene glycol, diethylene glycol, 1,2-propylene glycol, and 1,4-butylene glycol can be used.

Polyglycidyl esters of polycarboxylic acids which are produced by the reaction of epihalohydrin or a similar epoxy compound with an aliphatic or aromatic polycarboxylic acid can also be used. Examples of polycarboxylic acids are dicarboxylic acids such as adipic acid, succinic acid, glutaric acid, terephthalic acid, dimerized linoleic acid and the like.

The polyesters of the present invention are ungelled. By the term "ungelled" or "non-gelled" is meant the dispersed resin is substantially free of crosslinking and has an intrinsic viscosity when dissolved in a suitable solvent without depolymerization. The intrinsic viscosity of such a product is an indication of molecular weight. A gelled polymer, on the other hand, since it has an essentially infinitely high molecular weight, will have an intrinsic viscosity too high to measure.

To form a curable composition, the polyester oligomers as described above are combined with a crosslinking agent. The crosslinking agent is one which is capable of reacting with the active hydrogens in the polyester to give a thermoset composition upon curing. Examples of suitable crosslinking agents are aminoplasts and polyisocyanates including blocked polyisocyanates.

Aminoplasts are obtained by the condensation reaction of formaldehyde with an amine or an amide. The most common amines or amides are melamine, urea or benzoguanamine. However, condensation with other amines or amides can be employed. While the aldehyde employed is most often formaldehyde, other aldehydes such as acetaldehyde, crotonaldehyde, benzaldehyde and furfural may be used. The aminoplast contains methylol or similar alkylol groups, and preferably, at least a portion of these alkylol groups are etherified by reaction with alcohol to provide organic solvent-soluble resins. Any monohydric alcohol can be employed for this purpose including such alcohols as methanol, ethanol, butanol and hexanol. Preferably, the aminoplasts which are used are melamine-, urea- or benzoguanamine-formaldehyde condensates etherified with an alcohol containing 1 to 4 carbon atoms such as methanol, ethanol, butanol or mixtures thereof.

The amount of aminoplast which is used is from about 10 to 70 percent by weight, preferably 30 to 50 percent by weight, based on total weight of the aminoplast and polyester. Amounts less than 10 percent by weight usually result in insufficient cure, whereas amounts greater than 70 percent by weight serve no particular benefit.

Polyisocyanates and blocked polyisocyanates may also be used as curing agents. Examples of suitable polyisocyanates include monomeric polyisocyanates such as toluene diisocyanate and 4,4'-methylene-bis(cyclohexyl isocyanate), isophorone diisocyanate and NCO-prepolymers such as the reaction products of monomeric polyisocyanate such as those mentioned above with polyester or polyether polyols. A particularly useful isocyanate is the biuret from 1,6-hexamethylene diisocyanate commercially available from Bayer AG as DESMODUR N.

The polyisocyanate may optionally be blocked. Examples of suitable blocking agents are those materials which would unblock at elevated temperatures such as lower aliphatic alcohols such as methanol, oximes such as methyl ethyl ketoxime, and lactams such as caprolactam. Blocked isocyanates can be used to form stable one-package systems. Polyfunctional isocyanates with free isocyanate groups can be used to form two-package room temperature curable systems. In these systems, the polyester and isocyanate curing agent are mixed just prior to their application. The amount of polyisocyanate or blocked polyisocyanate curing agent which is used can vary between about 0.2 to 1.5, preferably from 0.3 to 1.3 equivalents of NCO per equivalent of active hydrogen of the polyester.

The polyester oligomers described above can be used in the formulation of high solids coating compositions. When combined with a cross-linking agent, they can be used in the formulation of thermosetting high solids coating compositions. The high solids coating compositions preferably contain greater than 50 percent, and most preferably greater than 60 percent by weight, non-volatile solids exclusive of pigments, solvents and other non-reactive components. The solids content is determined by heating the composition to 105°–110° C. for 1 to 2 hours to drive off the volatiles.

Besides the polyester oligomer and optionally the crosslinking agent, the high solids coating composition can optionally contain other hydroxyl functional polymers, pigment, liquid diluent, plasticizer, anti-oxidants, UV light absorbers, surfactants, flow control agents, as is well known in the art. Examples of flow control agents are crosslinked polymeric microparticles such as described in U.S. Pat. No. 4,147,688.

Coating compositions employing the polyesters of the present invention are designed for application by spraying, although other conventional methods of coating including brushing, dipping and flow coating can be employed, if desired. However, as mentioned above, they are especially formulated for spraying where they do not result in tacky overspray common with many high solids coating compositions. Usual spray techniques and equipment are utilized. High solids coatings using the polyesters of the present invention can be applied virtually over any substrate including wood, metal, glass, cloth, plastic, foams and the like, as well as over various primers. Coating compositions employing the polyesters of the present invention are useful for a wide variety of applications. They can be used for coating automotive parts such as automobile bodies and truck cabs. Also, they can be used for other coating applications such as coatings for appliance parts such as refrigerators and washing machines, and they can also be used for coil coating applications.

In general, coating thicknesses will vary depending upon the application desired. In general, coatings from about 0.1 to 5 mils have been found to be useful in most applications.

After application to the substrate, the coatings are cured. Curing is usually conducted at temperatures of about 100° to 200° C., and in most cases, the cure schedule is from about 10 to 30 minutes at about 130° to 180° C. Higher or lower temperatures with correspondingly longer or shorter times can be utilized, although the exact cure schedule best employed depends upon the nature of the substrate, as well as the particular components used in formulating the coating compositions. With aminoplast curing agents, acid catalysts can be employed, if desired, as they usually permit the use of lower temperature and shorter times for cure.

The invention will be further described by reference to the following examples. Unless otherwise indicated, all parts are by weight.

EXAMPLES

The following examples show the preparation of a polyester formed from reacting a 1,2-dicarboxylic acid anhydride with a polyol under conditions to form the half-ester, followed by reacting the half-ester with a polyepoxide to form the polyester. High solids coating compositions were then formulated with the polyester as the resinous binder.

EXAMPLE I

A neopentyl glycol-phthalic anhydride-polyglycidyl ether of bisphenol A polyester (2:2:1 molar ratio) was prepared from the following ingredients:

| Ingredients | Parts by Weight in Grams |
|---|---|
| Charge I | |
| Neopentyl glycol | 529.5 |
| Phthalic anhydride | 753.5 |
| Methyl amyl ketone | 288.0 |
| Charge II | |
| Triphenyl phosphine | 11.2 |
| Methyl amyl ketone | 32.0 |
| Charge III | |
| EPON 828[1] | 957.0 |
| Methyl amyl ketone | 640 |

[1]Polyglycidyl ether of bisphenol A having an epoxy equivalent of 188, available from Shell Chemical Company.

Charge I was added to a 5-liter flask and heated to 100° C. under a nitrogen blanket. The mixture exothermed with the temperature reaching 110° C. The reaction was held between 100°-110° C. for about one hour to form the half-ester as determined by acid number (190.6) and an IR scan which indicated only a trace of anhydride. Charge II was added over a 5-minute period and the reaction mixture heated to 140° C. Charge III was then added over a 30-minute period and the reaction mixture held for 2 hours at 140° C. to complete the reaction forming the polyester. The reaction mixture had a solids content (105° C., 2 hours) of 69.1 percent, an acid value of 8.7, an OH value of 182.8 and an infinite epoxy equivalent. Gas chromatography indicated the reaction mixture contained 1.18 percent free neopentyl glycol.

EXAMPLE II

A 1,6-hexanediol-hexahydrophthalic anhydride-polyglycidyl ether of hydrogenated bisphenol A polyester (2:2:1 molar ratio) was prepared from the following ingredients:

| Ingredients | Parts by Weight in Grams |
|---|---|
| Charge I | |
| 1,6-Hexanediol | 244.4 |
| Hexahydrophthalic anhydride | 318.9 |
| Methyl amyl ketone | 135.0 |
| Charge II | |
| Triphenyl phosphine | 5.25 |
| Methyl amyl ketone | 15.0 |
| Charge III | |
| EPONEX 1511[1] | 486.7 |
| Methyl amyl ketone | 300.0 |

[1]Polyglycidyl ether of hydrogenated bisphenol A having an epoxy equivalent of 235, available from Shell Chemical Company.

Charge I was added to a 2-liter flask and heated to 80° C. under a nitrogen blanket. The mixture exothermed with the temperature reaching 100° C. The reaction was held at about 100° C. for about 2 hours to form the half-ester as determined by acid number (161.2) and an IR scan which indicated no anhydride remained. Charge II was added over a 5-minute period and the reaction mixture heated to 140° C. Charge III was then added over a 30-minute period and the reaction mixture held for 2 hours at 140° C. to complete the reaction forming the polyester. The reaction mixture had a solids content (105° C., 2 hours) of 69.1 percent, an acid value of 8.1, an OH value of 160.2 and an infinite epoxy equivalent. Gas chromatography indicated the reaction mixture contained 3.9 percent free 1,6-hexanediol.

EXAMPLES III AND IV

High solids coating compositions with aminoplast curing agent were prepared from the polyesters of Examples I and II. Each coating composition was prepared by mixing together the following:

| Ingredients | Parts by Weight in Grams |
|---|---|
| Polyester | 200.0 |
| Curing agent solution[1] | 109.6 |

[1]The curing agent solution comprised 150.0 grams of an aminoplast curing agent (CYMEL 303 available from American Cyanamid Company), 114 grams of methyl amyl ketone and 10.0 grams of a catalyst solution which comprised 10 grams of p-toluene sulfonic acid dissolved in 10 grams of butanol.

The coating composition contained 65 percent resin solids, 1 percent p-toluene sulfonic acid catalyst based on resin solids. The polyester/aminoplast weight ratio was 70/30.

The coating compositions were drawn down with a 0.003 Bird applicator on zinc phosphate pretreated steel panels. The coated panels were flashed for 10 minutes at ambient conditions and then were baked at 275° F. (135° C.) for 15 minutes. Table I below shows various properties for the coating compositions and for the cured coatings. The coating composition of Example III used the polyester of Example I. The coating composition of Example IV used the polyester of Example II. The coating compositions were also sprayed onto metal substrates. After 8 hours, the overspray was dry and non-tacky.

EXAMPLE V

A high solids coating composition using the polyester of Example I and a blocked isocyanate curing agent was prepared by mixing together the following ingredients:

| Ingredients | Parts by Weight in Grams |
|---|---|
| DESMODUR N-75[1] | 76.0 |
| Polyester of Example I | 104.8 |
| Methyl amyl ketone | 32.6 |
| Dibutyltin dilaurate | 0.15 |

[1]75% resin solids solution in xylene of biuret from 1,6-hexamethylene diisocyanate, commercially available from Bayer AG.

The coating composition contained about 65 percent by weight resin solids, 0.1 percent by weight dibutyltin dilaurate based on resin solids. The NCO/OH equivalent ratio was about 1.2/1.0.

EXAMPLE VI

A high solids coating composition using the polyester of Example II and a polyisocyanate curing agent was prepared by mixing together the following ingredients:

| Ingredients | Parts by Weight in Grams |
|---|---|
| DESMODUR N-75 | 76.0 |
| Polyester of Example II | 120.7 |
| Methyl amyl ketone | 32.6 |

| Ingredients | Parts by Weight in Grams |
|---|---|
| Dibutyltin dilaurate | 0.16 |

The coating composition contained about 65 percent by weight resin solids, 0.1 percent by weight dibutyltin dilaurate catalyst. The NCO/OH equivalent ratio was about 1.2/1.0.

The coating compositions were drawn down with a 0.003 Bird applicator on zinc phosphate pretreated steel panels. The coated panels were flashed for 10 minutes at ambient conditions and baked at 275° F. (135° C.) for 15 minutes. Table I below shows the various properties for the coating compositions and for the cured coatings. The coating compositions were also sprayed onto metal substrates. After 8 hours, the overspray was dry and non-tacky.

TABLE I

Properties for Coating Compositions and for 135° C. Cured Coatings of Examples III–VI

| Example No. | Viscosity #4 Ford Cup in seconds | Resin Solids at 110° C. for 1 hour | VOC[1] (g/l) | Solvent Resistance[2] | Pencil Hardness[3] | Impact Resistance[4] Direct/Reverse (cm-kg) | Overspray |
|---|---|---|---|---|---|---|---|
| III | 64.7 | 63.5 | 378 | pass | 2H | 23/6 | non-tacky |
| IV | 32.5 | 62.2 | 380 | pass | 2H | 46/6 | non-tacky |
| V | 100.3 | 64.4 | 362 | pass | 2H | 115/46 | non-tacky |
| VI | 81.2 | 61.4 | 378 | pass | H | 185/185 | non-tacky |

[1]Volatile Organic Content determined according to ASTM D-3960-81.
[2]Solvent Resistance determined by rubbing with normal hand pressure a xylene-saturated cloth back and forth (double rub) across the cured coating. A "pass" rating indicates the cured coating withstood 50 double rubs with no marring of the coating.
[3]Pencil Hardness determined by attempting to etch the cured coating with pencils of increasing hardness. When the coating is finally etched, this is reported as the Pencil Hardness.
[4]Impact Resistance determined with a Gardner Impact Tester. The coated panels were subjected to increasing amounts of impact until the coating cracked. For reverse impact, the side opposite the coating being evaluated was impacted. For direct impact, the side of the coating being evaluated was impacted.

The coating compositions of Examples V and VI were also drawn down with a 0.003 Bird applicator on zinc phosphate pretreated steel panels and allowed to moisture cure at ambient conditions for 24 hours. Table II below shows various properties of the cured coatings.

TABLE II

Properties for Moisture Cured Coatings of Examples V and VI

| Example No. | Solvent Resistance | Pencil Hardness | Impact Resistance Direct/Reverse (cm-kg) |
|---|---|---|---|
| V | pass | HB | 161/92 |
| VI | pass | B | 161/161 |

We claim:

1. A process for preparing an ungelled polyester oligomer which comprises:
   (A) reacting a 1,2-dicarboxylic acid anhydride with a polyol under conditions sufficient to form a half-ester with substantially no polyesterification product, and
   (B) reacting said half-ester with a polyepoxide under conditions sufficient to form said ungelled polyester oligomer.

2. The process of claim 1 in which the 1,2-dicarboxylic acid anhydride is reacted with the polyol by mixing together and heating to a temperature less than 150° C.

3. The process of claim 2 in which the half-ester and the polyepoxide are reacted by mixing together and heating to a temperature less than 160° C.

4. The process of claim 1 in which the molar ratio of anhydride to polyol in step (A) is greater than or equal to 1.

5. An ungelled polyester oligomer having the following structural formula:

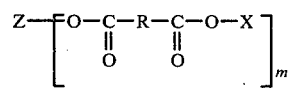

where Z is the residue of a polyepoxide after ring opening with a carboxylic acid group; R is an aliphatic or an aromatic group; X is the residue of a polyol after reaction with a carboxylic acid anhydride and m corresponds to the number of epoxy groups of the polyepoxide ring opened with carboxylic acid groups.

6. The polyester of claim 5 in which the polyol contains from 2 to 20 carbon atoms.

7. The polyester of claim 5 in which the polyol is an aliphatic diol or triol.

8. The polyester of claim 7 in which the aliphatic diol or triol contains from 2 to 10 carbon atoms.

9. The polyester of claim 8 in which the aliphatic diol or triol is selected from the class consisting of neopentyl glycol, 2,2,4-trimethylpentane-1,3-diol, 2,2-dimethyl-3-hydroxypropyl 2,2-dimethyl-3-hydroxypropionate, diethylene glycol, dipropylene glycol, 1,6-hexanediol and trimethylolpropane.

10. The polyester of claim 5 in which R contains from 2 to 30 carbon atoms exclusive of the carbon atoms in the anhydride moiety.

11. The polyester of claim 5 in which the polyepoxide is a polyglycidyl ether or ester.

12. The polyester of claim 5 in which the polyepoxide is a diepoxide.

13. A composition comprising the polyester oligomer of claim 5 in combination with a curing agent.

14. The composition of claim 13 in which the curing agent is an aminoplast.

15. The composition of claim 14 in which the aminoplast is present in amounts of about 10 to 70 percent by weight based on total weight of the aminoplast and the polyester.

16. The composition of claim 13 in which the curing agent is a polyisocyanate.

17. The composition of claim 16 in which the polyisocyanate is a blocked polyisocyanate.

18. The composition of claim 13 which additionally contains crosslinked polymeric microparticles.

* * * * *